United States Patent

Lutterkort

[15] 3,686,560
[45] Aug. 22, 1972

[54] STABILIZED POWER SUPPLY SYSTEMS

[72] Inventor: Hans Heinz Lutterkort, London, England

[73] Assignee: International Computers Limited, London, England

[22] Filed: May 6, 1971

[21] Appl. No.: 140,915

[30] Foreign Application Priority Data

May 26, 1970 Great Britain..........25,232/70

[52] U.S. Cl. .........................321/18, 317/16, 323/8, 323/22 SC, 323/81
[51] Int. Cl. ............................................H02m 7/20
[58] Field of Search.........317/16, 33; 321/18; 323/8, 323/18, 22 SC, 24, 81

[56] References Cited

UNITED STATES PATENTS

| | | | |
|---|---|---|---|
| 2,850,694 | 9/1958 | Hamilton | ..................323/8 X |
| 3,355,650 | 11/1967 | Tolmie | ....................323/22 SC |
| 3,428,882 | 2/1969 | Gilbert | ........................321/18 |
| 3,546,567 | 12/1970 | Shimp | ..........................323/18 |
| 3,383,623 | 5/1968 | Vercellotti et al. | ..........323/24 |

*Primary Examiner*—Gerald Goldberg
*Attorney*—Hane, Baxley & Spiecens

[57] ABSTRACT

A D.C. power supply employs shunt stabilization of the output of a full-wave rectifier for an A.C. source. The A.C. source is a low-loss, high impedance type and a shunt stabilizer can be connected across the source output and/or the rectifier output.

3 Claims, 3 Drawing Figures

INVENTOR
HANS HEINZ LUTTERKORT
BY Hans Bartley and Spiecens
ATTORNEYS

STABILIZED POWER SUPPLY SYSTEMS

BACKGROUND OF INVENTION

The present invention relates to improvements in stabilized power supply systems.

It is frequently required to provide stabilized power supplies for supplying a regulated D.C. voltage. In particular, in cases where so-called integrated circuits are used for performing logic operations in signal networks, such as are used, for example, in data processing apparatus, it is frequently required to provide a low voltage supply, for example, a supply of direct current at, say 5 volts. In such cases the load on the supply represented by the networks may not change by very great amounts. Various forms of stabilizing circuit have been proposed, and it is to be noted that in such cases shunt stabilization is potentially more efficient than series stabilization. Shunt stabilization then appears to offer the advantage that, for example, only the small variations in the dynamic load need to be compensated by the stabilizer; short-circuit protection is not normally required and that the shunt stabilizer plus the load present a substantially constant impedance to the supply with the result that components may be conservatively rated.

However, in known shunt stabilization circuits where the current required for the load and the stabilizer shunt is drawn from a source having appreciable voltage variation, such as the public electricity mains, it has been found necessary to introduce a high series impedance in the supply connection in order to limit the current that requires to be handled by the stabilizer. This impedance usually takes the form of a series resistance and resultant power losses in this resistance means that the advantages offered by the use of the shunt stabilizer are not realized in practice.

SUMMARY OF THE INVENTION

According to the present invention a D.C. power supply system includes a low-loss, high impedance source of alternating current having a first output, a full-wave rectifying arrangement connected to the first output to produce a direct current on a second output, to which second output a load circuit may be connected, and a stabilizing shunt arrangement connected across one of the outputs. The connection of the rectifying arrangement to the first output may include an isolating transformer.

Preferably, the stabilizing shunt arrangement for the D.C. power supply system includes means for temporarily connecting a low resistance shunt path across said one output. In the case where the arrangement is connected across said first output the path may include the conductive path of a triac, the triac being repeatedly switched to conduct over a portion of a succession of A.C. cycles. In the case where the arrangement is connected across a D.C. output the path may include the collector/emitter electrode path of a switchable transistor.

BRIEF DESCRIPTION OF THE DRAWINGS

Apparatus embodying the present invention will now be described, by way of example, with reference to the accompanying drawings, in which.

DESCRIPTION OF THE PREFERRED EMBODIMENTS

Figure 1:
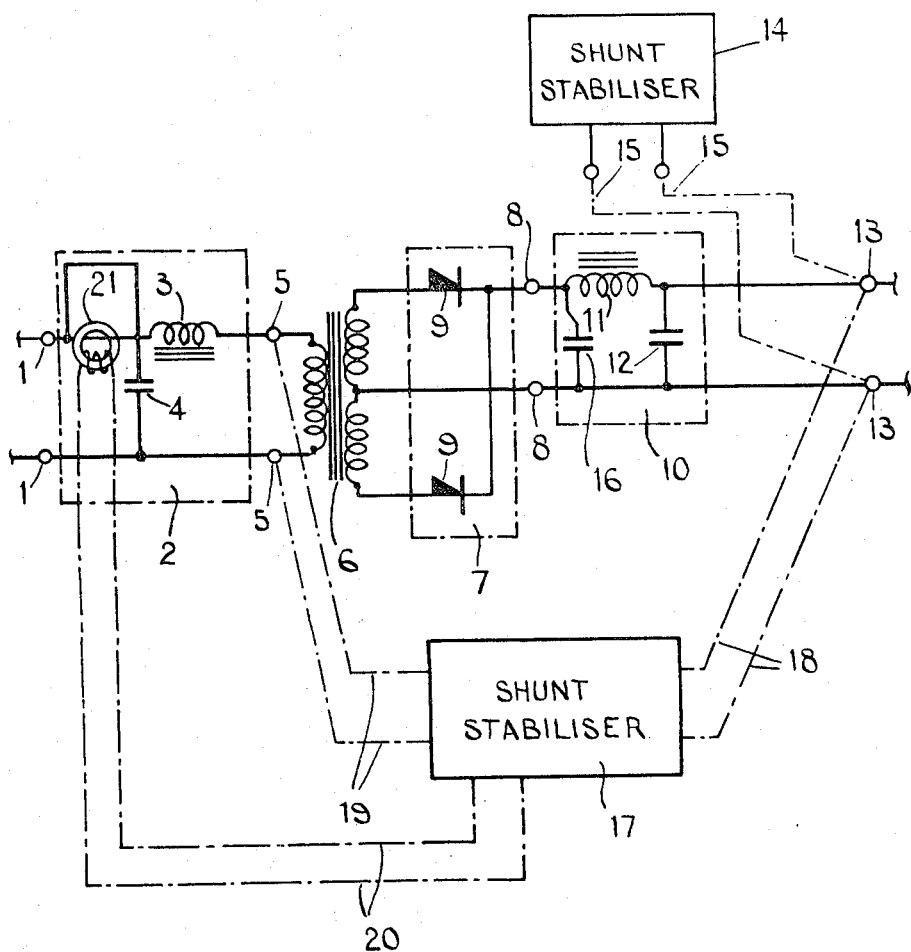
FIG. 1. shows in diagrammatic form a power supply arrangement.

In FIG. 1, the arrangement has a pair of input terminals constituting an A.C. source. This A.C. source may be a supply derived from public service mains or may, for example, be an independently generated supply, as from a motor-driven generator.

The terminals 1 are connected to a reactance arrangement 2. The reactance arrangement 2 is provided to limit the current drawn from the A.C. source and to provide power factor correction. Hence, the reactance arrangement 2 has a first reactance, which may be either capacitive or inductive, chosen to permit a required current to be drawn from the supply, and a second reactance which is inductive if the first reactor is capacitive and conversely, is capacitive if the reactor is inductive. For the purposes of the present example, the first reactance 3 is shown as inductive and consists of a choke. The second reactance 4 is, in the present example, a capacitor. It will be appreciated that the value of capacitance of the reactor 4 is chosen in the conventional manner so that in conjunction with the inductance of the reactance 3 an acceptable power factor is produced by the overall arrangement 2. It will also be appreciated that the reactance 4 may also contribute to the current limiting effect of the arrangement 2 if required. The output of the reactance arrangement 2 is available at a pair of terminals 5.

The terminals 5 are connected to the input terminals of a transformer 6, which has a conventional center - tapped secondary winding. The secondary windings of the transformer 6 are connected to a rectifier circuit 7, and the output of the circuit 7 is connected to a pair of D.C. terminals 8. In the example shown, the rectifier circuit 7 consists of a pair of diodes 9 connected respectively each at one end to the outer ends of the secondary winding of the transformer 6, other ends of the diodes 9 being connected to one of the terminals 8. The second terminal 8 is connected directly to the center - tap of the secondary winding of the transformer 6. Thus, the diodes 9 are connected to form a full-wave rectifying circuit. It will be appreciated that a conventional bridge rectifying circuit may alternatively be used for the circuit 7, since it is also full-wave rectifying configuration, but that it is preferred not to use a half-wave rectifying arrangement for the rectifier circuit 7.

In conventional manner the D.C. supply on the terminals 8 is subjected to a filtering operation by a filter 10. In the example shown a choke 11 is inserted in a series with one of the terminals 8 and a corresponding one of a pair of output terminals 13. The second terminal 8 is connected to the second terminal 13 and a filter capacitor 12 is provided across the terminal 13. A reservoir capacitor 16 is connected across the input terminals of the filter 10. Thus, the choke 11 and capacitor 12 combination provide a conventional ripple filter arrangement. It will be appreciated that other conventional smoothing arrangements may be incorporated in the filter 10. It is to be noted that, in general, the reservoir capacitor 16 presents such a low impedance that a continuous current drain from the supply (as produced, for example, by a stabilizing shunt) has little effect on a ripple component in the D.C. output. For this reason it is preferred to use a choke, such as the choke 11, in the filter 10. The addition of the capacitor 12 following the choke tends then to render the effect of the filter on the ripple component independent of the effective resistance of a load applied to the system.

The output terminals 13 provide the points at which the stabilizing arrangement is connected to a utilizing load circuit. The present arrangement as indicated in the drawing is intended for use under conditions where the variation of current drawn by the load circuit applied across terminals 13 is small and where the regulation of the A.C. from the supply source to the terminals 1 is good. In this case a conventional shunt stabilizer 14 is connected across the terminals 13 as indicated by broken connection lines 15, and this arrangement ensures that the current through the system from the terminals 1 to 13 is substantially constant, variations in current drawn by a load connected to the terminals 13 being compensated by variations in current drawn by the stabilizer 14. Under these conditions the stabilizer 14 is arranged so that even when the load circuit is drawing the maximum current envisaged, the stabilizer is also drawing a small current.

The stabilizer 14 then preferably includes an auxiliary simple power supply and a detecting stage which is responsive to variation, usually of the output voltage, from a predetermined level to alter the current drawn through a shunt stabilization path.

Figure 2:
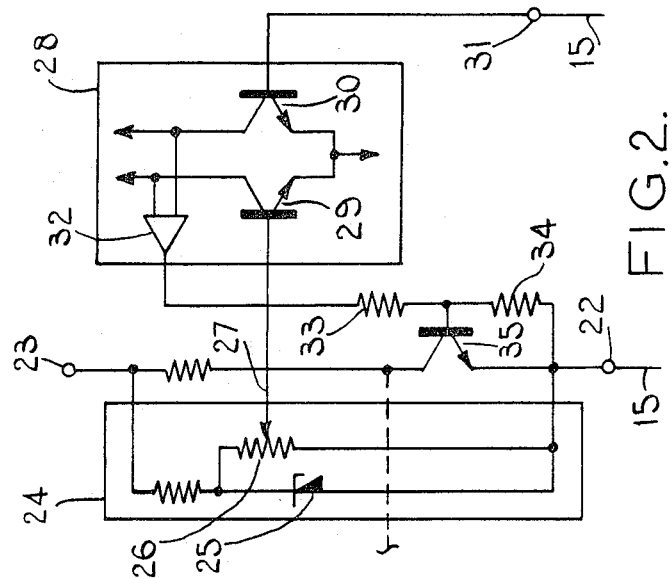
FIG. 2. shows diagrammatically one form of shunt stabilizer.

Under other circumstances, for example, where the regulation of the A.C. from the supply is poorer, or where the variation in current drawn by the load is considerable, the stabilizer 14 is preferably one in which a low resistance path is switchable across the lines 15. For example, see FIG. 2, the stabilizer 14 may contain an auxiliary power supplying having one connection 22 common to the negative one of the output terminals 13 and a second supply connection 23 at, say 18 volts. A reference voltage source 24 within the stabilizer 14 may comprise a zener diode 25 shunted by a potential divider 26, to supply a reference voltage at its output 27. A comparator 28 serves to provide an output representing the extent to which the positive terminal of the load output terminals 13 exceeds the reference voltage. Where the comparator 28 includes a long-tailed pair, the reference voltage output 27 is connected to the base of one transistor 29. The second transistor 30 then has its base connected at 31 to the positive one of the output terminals 13, the two transistors 29 and 35 having a common emitter connection. An amplifier 32 for the difference signal may then be connected to the first transistor 29 and the second transistor 30 to provide a signal indicative of the departure of the voltage at the terminals 13 from the predetermined reference level. This signal is used via a voltage divider 33, 34, to control the conduction of a further transistor 35 in a resistance path shunting the lines 15. Thus this further transistor 35 is switchable by the difference signal to provide an effective low resistance path between the lines 15 whenever the output D.C. level rises above the predetermined level.

It will be appreciated that this form of stabilizer 14 may be connected otherwise than as indicated in the drawing. For example, the lines 15 may be connected to the terminals 8 instead of the terminals 13. However, it will be understood that the load voltage level sensing circuit would remain connected across terminals 13.

Figure 3:
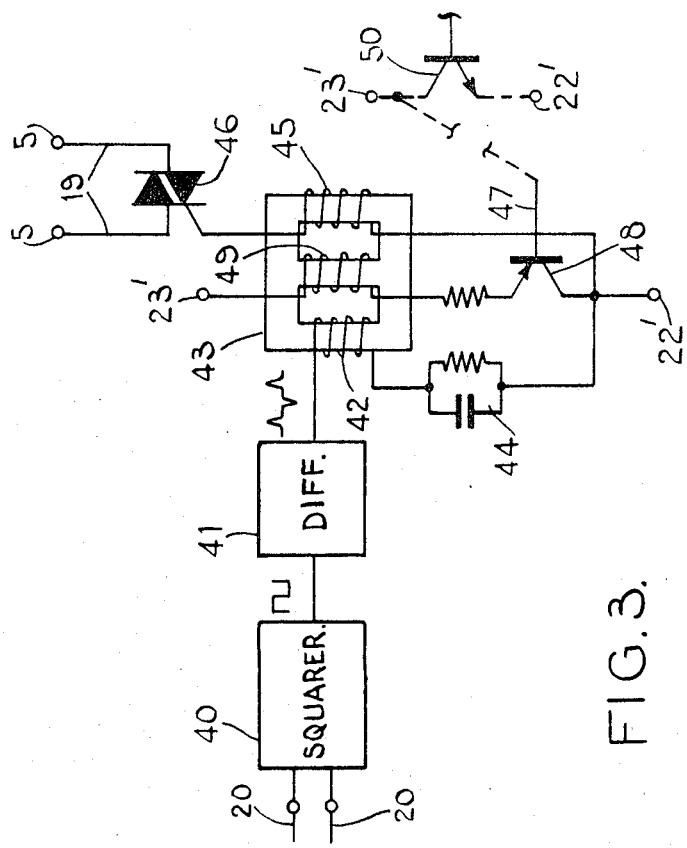
FIG. 3. shows another form of stabilizer.

In another form, the stabilizer may alternatively be connected to provide a shunt path across those parts of the arrangement which carry A.C., for example across the terminals 5 or across the secondary windings of the transformer 6. In a typical arrangement, a stabilizer 17 is connected as shown by broken lines 18, 19 and 20 respectively in FIG. 1. The stabilizer 17 once again includes its own auxiliary power supply and has a current transformer 21 threaded by an input connection from the main supply. The secondary winding of the transformer 21 is connected to the stabilizer 17 by lines 20. As shown in FIG. 3 the current waveform represented by signals on these lines 20 is squared in squarer 40 and differentiated in a differentiater 41. Resultant impulses are passed through a first winding 42 on a saturable-core transformer 43 to the lower voltage connection of the auxiliary power supply 22', 23' via a suitable network 44. A second winding 45 on this transformer is connected to the triggering electrode of a triac 48 which is connected across, say, the terminals 5 by the lines 19. A reference level balancing circuit in the stabilizer produces a control signal whenever the D.C. output voltage over the lines 18 is less than a predetermined level and this control signal on line 47 is used to control a transistor 48 which in turn permits a current to flow in a third, saturating, winding 49 on the saturable-core transformer. The central signal source may be the same as for FIG. 2 but with appropriate connections to effectively invert the signal from the comparator 28. This result can be achieved relative to the action of the transistor 35 of FIG. 2 using a transistor 50 connected as indicated in dashes between FIGS. 2 and 3. The action of this form of stabilizer is that while the D.C. voltage is high enough to cut off the control transistor 48, the saturable-core transformer is effective to pass the impulses derived from the transformer 21 to trigger the triac on each A.C. half-cycle so that it provides a low resistance path across the lines 19. When the D.C. voltage falls, however, the control transistor conducts to saturate the core of the saturable-core transformer which then blocks the triggering impulses so that the triac does not conduct.

It will be appreciated that either form of the stabilizer, 14 or 17 may be used alone, the appropriate form being chosen according to whether it is applied across terminals carrying A.C. or D.C. It is also to be understood that the characteristics of the two forms produce slightly different stabilization effects. For example, the A.C. shunt stabilizer such as 17 provides a very efficient voltage level control but is inferior to the D.C. form in that it permits a higher ripple component at the D.C. output terminals 13. Hence, for the most efficient voltage control with a low ripple component it is possible to combine both forms of stabilization by using a triac across the A.C. — carrying terminals and a transistor shunt path across the D.C. terminals. In this case a common reference level circuit may be used to provide the control signal to switch in the triac and transistor shunt paths as shown by the dashed interconnection of FIGS. 2 and 3, single auxiliary power supply also being shared.

In all cases, however, it will be realized that the voltage at the output terminals 13 is compared with a predetermined reference level to provide a control signal if the D.C. output voltage exceeds this reference level. The control signal is then used to switch in a low resistance path to permit a short-circuit current to flow, and this path may be provided at some point after the series reactance arrangement 2. Thus, the impedance of the arrangement 2 limits the flow of current from the source into the system during the period when the low resistance path is switched-in. It is also to be understood that while this path is switched into circuit for example, across the terminals 8, then the discharge of the reservoir capacitor through the short-circuit is to be avoided. Thus, for example, in this case additional diodes would be used to isolate the reservoir capacitor from the low-resistance path.

It has been found that the use of the reactive components in that part of the system connected to the primary winding of the transformer enables a shunt stabilizer to be employed in a system having an overall efficiency of the order of 60 percent (A.C. input to useful D.C. output). Thus the reactor arrangement 2 provides a high enough impedance to permit the use of a shunt stabilizer without a consequential flow of high current through the system but at the same time produces a low power loss in the transformer primary circuit that permits the efficiency advantage of the shunt stabilizer to be realized in the overall system.

It is also to be noted that the transformer 6 serves to isolate output supply lines connected to the terminals 13 from the A.C. supply lines connected to the terminals 1. While such isolation may be achieved by other means and hence for this reason the provision of an isolating transformer 6 is not essential, it is preferred to use a transformer in the connection between the rectifying circuit 7 and the reactor arrangement 2 to permit the adjustment of the load circuit to the reactance limited primary current. Moreover, the transformer 6 provides a simple method of overcoming variation of source voltage or load conditions by tap changing on the transformer windings. It will be seen that the present proposals provide a series reactor in the A.C. path before rectification that serves to limit the current drawn from the source, which in turn limits the effective losses in the series impedance. Thus the advantages of shunt stabilization reviewed earlier are realized to a greater extent than heretofore. It will also be appreciated that where a ferro-resonant "tank" circuit is used in conjunction with the A.C. supply, this circuit itself can also be utilized to provide the low-loss current limitation. Moreover, the power-factor correcting reactance may also contribute to the low-loss current limitations.

The present proposals are particularly suitable for applications in which low voltage D.C. supplies, of, say, the order of 5 volts, are required under substantially steady load conditions. Hence, the proposals are particularly suitable for applications in computers using integrated circuit modules, for example, and in these cases it is also found that noise problems are considerably reduced.

I claim:

1. A D.C. power supply system comprising a low-loss high impedance source of alternating current as a first output; a full wave rectifier connected to the first output to produce a direct current at a second output; a first shunt stabilizer including a triac having its conductive path connected in a low resistance shunt path across the first output, first switching means for repeatedly switching the triac to conduct over a portion of a succession of A.C. cycles, and means for inhibiting the switching means except when the D.C. load signal exceeds a predetermined level; a second shunt stabilizer means having a transistor with its emitter collector in a low resistance path shunting the second output and second switching means for switching the transistor to conduct when the D.C. load signal exceeds said predetermined level.

2. A D.C. power supply system as claimed in claim 1, and comprising means for providing a reference signal at said predetermined level, a comparator connected to receive said reference signal and said D.C. load signal and to provide a switching signal for the transistor when said level signal exceeds said reference signal, and means responsive to conduction of the transistor for disabling the inhibiting means.

3. A D.C. power supply system as claimed in claim 1, wherein the first switching means comprises means for squaring an A.C. signal from said source, and differentiation means for deriving from the square wave, pulses at the start of each half cycle, and wherein the first switching means also includes a saturable transformer having a first winding for said pulses, a second winding for supplying the control electrode of the triac, and a third normally energized saturating winding included in the inhibiting means.

* * * * *